FIG. 2.

June 19, 1956 J. H. SANDERS 2,751,328
TOOTHPASTE PROCESS

Filed Oct. 2, 1951 3 Sheets—Sheet 3

INVENTOR.
JUDSON H. SANDERS.
BY
ATTORNEYS.

United States Patent Office 2,751,328
Patented June 19, 1956

2,751,328

TOOTHPASTE PROCESS

Judson H. Sanders, Wyoming, Ohio, assignor to The Procter & Gamble Company, Cincinnati, Ohio, a corporation of Ohio Application October 2, 1951, Serial No. 249,368

7 Claims. (Cl. 167—93)

This invention relates to a new and improved process for the preparation of toothpastes and other cosmetic pastes and creams of similar consistency which make use of at least one hydrophilic colloidal carbohydrate binder, such as a natural or manufactured gum or mucilaginous seaweed extract, for the attainment and maintenance of proper consistency and texture.

These carbohydrate binders are obtained from many regions of the plant kingdom, and are closely interrelated in chemical structure, being comprised essentially of various polysaccharides and their reaction products. For example, the natural gums are exudations of trees and shrubs; the phycocolloidal binders are either natural or modified extracts of marine algae; and the synthetic gums are chemically substituted products of cellulose, which makes up part of the tissue and fiber of almost all plants.

The natural land gums such as gum tragacanth, gum karaya, and gum acacia are very complex polysaccharides and/or polyuronides containing more than one type of monosacchardie unit and joined by various types of glycosidic linkages. For example, gum arabic and other acacia gums, which are obtained from such species as *Acacia senegal*, *Acacia mellifera* and *Acacia seyal* are metal salts of complex organic acids yielding on hydrolysis a mixture of L-arabinose, D-galactose, L-rhamnose, D-glucuronic acid and D-galacturonic acid. Gum tragacanth, which is obtained from such species as *Astralagus gummifer*, *A. kurdicus*, *A. brachcalyx*, *A. eriostylus*, *A. pynocladus*, *A. verus*, *A. leiocladus*, *A. adscendenes*, *A. strobiliferus*, and *A. heratensis*, is largely a calcium salt of complex organic nature yielding L-arabinose, D-xylose, L-fucose, D-galactose and D-galacturonic acid on hydrolysis. The land plant gums include gum karaya, gum ghatti and mesquite gum and many others.

The mucilaginous extracts of seaweed or sea algae are generally composed chiefly of salts of sulfate esters of polysaccharides. These polysaccharides are usually formed from a single type of monsaccharide unit and with the exception of the algins are not polyuronides. For example, Irish moss extract or carragheenin which is derived from red algae of the genus *Chondrus crispus*, consists principally of galactose residues. Agar, which is derived from the Gelidiaceae family of red algae including such species as *Gelidium amansii*, *Eucheuma muricatum*, *Gelidium nudifrons*, *G. pyrimidale*, *G. cartilagineum*, *G. australe* and *G. lichenoides*, is comprised largely of galactopyranose residues. Algin extracts or alginates which are obtained largely from giant marine kelps of the brown algae or Phaeophyceae class such as Macrocystis, Nereocystis, Pelagophycus, Fucus, and Laminaria consists principally of D-mannuronic acid units.

The most important of the manufactured or synthetic gums are chemically substituted cellulose ethers such as methyl cellulose, carboxy methyl cellulose, and hydroxy ethyl cellulose.

Other miscellaneous hydrophilic colloidal carbohydrate binders include the natural and modified starches. These and all the other aforementioned gums and extracts are intended to be included by the expression "hydrophilic colloidal carbohydrate binder" and similar expressions as used throughout the present specification and appended claims.

In the prior practice used in making toothpaste and other pastes and creams of similar consistency which are thickened by such hydrophilic colloidal binders of a carbohydrate nature, it has been customary to prepare a large batch of gel or mucilage by hydrating or dissolving the binder in question with water in large kettles or mixers which are usually jacketed and heated also. Into this mucilage or gel are then blended and worked the remaining solid and liquid ingredients slowly and gradually, using a large heavy-duty batch mixer such as a dough mixer or pony mixer. Such heavy-duty mixing equipment is large and awkward and usually prone to aerate the mix. Lumps or cakes of partially wet powders occur frequently in such mixes even with slow careful additions of ingredients. Such lumps, once formed, are exceedingly difficult to work out, requiring either excessively long mixing cycles, or use of special equipment such as milling rolls or colloid mills, etc. Removal of entrapped air from a large batch of such viscous material is exceedingly difficult and necessarily very slow, requiring gradual application of partial vacuum accompanied by working of the batch and gradual increase of vacuum as the air is worked out.

The primary objects of my invention are:

(1) To streamline the process of manufacturing products in which a carbohydrate-type hydrophilic colloidal binder is used to help produce and maintain proper consistency, texture and continuity;

(2) To make continuous or semi-continuous operation in the processing of such products feasible and convenient;

(3) To eliminate the need for large, awkward, heavy-duty kettles and mixers in the large scale production of such products;

(4) To eliminate the need for the customary dispersing apparatus such as rolls and colloid mills;

(5) To avoid the incorporation of air in the product;

(6) To increase the ease, speed, and completeness of removing gas or air from the product;

(7) To shorten the process and reduce the finished product inventory and storage requirements;

(8) To reduce the requirements of process area, storage space and equipment;

(9) To improve sanitation of product;

(10) To increase the ease and completeness of dispersion of the various ingredients incorporated;

(11) To improve the smoothness, uniformity and appearance of the finished product;

(12) To increase the effectiveness of the binders employed, reducing the amount required for a given job or increasing the stability of the product for a given concentration of a given binder therein.

(13) To minimize local overheating that causes chemical breakdown of certain ingredients.

Other objects and features of the invention will be apparent from a consideration of the detailed description which follows.

I have discovered that with the aid of my new mixing technique, toothpastes and similar products in which these carbohydrate-type, hydrophilic colloidal binders are used can be produced continuously or semi-continuously with eminent success in quality of product achieved, as well as in the simplification of equipment and operating requirements effected. The mixing procedures which form the basis of this new process are fundamentally different from those customarily employed in this art. Instead of activating the binder in a preliminary step, care is taken in my process to delay activation of the binder until the binder and substantially all of the solid ingredients have been dissolved or thoroughly dispersed and wet out as finely divided powders in the liquid media, and further to delay activation of the binder sufficiently to prevent the conversion of the mixture from the consistency of a fluid slurry to the consistency of a paste or putty until substantially all of the solid ingredients have been intimately mixed with substantially all the liquid ingredients. The underlying feature of my mixing procedure is the accomplishment of complete wetting out and dispersal of the dry powders as well as complete physical mixing of substantially the entire stock all in a relatively low viscosity medium.

The exact method and sequence of combining the several ingredients in order to produce the above conditions of mixing are subject to considerable variation. Most of the possible variations are non-critical to the success of the present process, being matters of free choice such as, for example, which of several liquid ingredients to use for wetting out and slurrying the several solid ingredients, or the order in which to combine separate slurries or in which to wet out different solids in the same slurry. The only important limitations are the following. First, the hydrophilic colloidal binder in dry, comminuted, unhydrated form must be dispersed in a non-hydrating liquid. This non-hydrating liquid is commonly substantially non-aqueous, i. e. one containing no more than about 10% water, but it should be substantially water-miscible and, preferably it is a low-molecular, water-miscible aliphatic alcohol such as methanol, ethanol, glycols, glycerine, hexandiol 1:4, and heptantriol 1:4:7. By the term "low-molecular alcohol" as used above and elsewhere herein is meant any organic compound containing one or more free alcoholic hydroxy groups and not more than 8 carbon atoms and made up only of the three elements, C, H, and O. Secondly, the relative amounts of liquids and solids used in making each slurry should not be so unbalanced that the slurry in question becomes too thick to be efficiently worked and smoothed by simple agitation before the solids are completely wet out. Thirdly, the number and difficulty of the mixing steps to be carried out after the binder and the water are combined must be limited so that they can be completed prior to substantial hydration of the binder, i. e. while the mix is reasonably fluid. Some binders are so unreactive (i. e. they hydrate so slowly at ordinary atmospheric temperatures when they have first been wet out with a nonaqueous liquid), that this third limitation practically does not exist. However, most binders are so reactive that, in order to fulfill this third condition, the ingredients to be mixed must be incorporated by preliminary mixing steps into two separate slurries, one containing the binder and the other the water. Then, by mixing together steady, proportioned, concurrently and continuously flowing streams of these two separate slurries as rapidly as possible, a homogeneous blend of the two can be obtained before substantial hydration of the binder and resultant thickening of the slurry occur. This will be explained in more detail later.

In general then, the slurry-making process which is suitable for use with any hydrophilic colloidal carbohydrate binder may be described as comprising the following steps: (a) dissolving in the various liquid ingredients solid ingredients soluble therein, other than the binder; (b) wetting out and dispersing the hydrophilic colloidal carbohydrate binder in dry comminuted, unhydrated form in a non-hydrating liquid; (c) combining together all of the principal liquid ingredients other than the binder slurry from (b), (By "principal" here is meant comprising more than 2% by weight of the total composition.); (d) wetting out and dispersing substantially all of the other solid ingredients in comminuted form into the liquids from (b) and (c), the relative amount of solids dispersed in each batch of liquid being sufficiently small relative to the amount of liquid available so that a fluid slurry is produced from each batch by this step; (e) combining and mixing together the slurry containing the binder and the slurry containing the water with sufficient speed and at a temperature sufficiently low to produce a uniform mixture of the two in combination before hydration of the binder has progressed sufficiently to produce a highly viscous mix, thus avoiding the necessity of effecting appreciable mixing in a high viscosity medium.

When a very reactive binder is used, i. e. one which hydrates hapidly even at low temperatures and even when first wet out with non-aqueous liquid, it is difficult to combine the two large batches of slurry rapidly enough to complete the mixing job before sufficient hydration of the binder occurs to impart considerable viscosity to the mix. For this reason, in large scale production with a reactive binder, it is not practical to carry out this final slurry making step of my process in batch equipment. Instead, the two separate semi-final slurries can be fed together continuously at suitable and proportioned rates and mixing of the separate proportioned streams effected almost instantaneously. If the remaining processing of the final homogeneous slurry is also to be carried out continuously, the rate at which the separate semi-final slurries are combined can be adjusted to produce the desired stock flow rate through the processing equipment. If the combined slurry is to be processed in batch equipment, the rate at which the separate slurries are combined will generally be the highest possible rate at which the separate streams can be mixed thoroughly before excessive thickening of the mix due to binder hydration.

All of the steps in slurry making can, of course, be carried out continuously and thus a completely continuous process of making toothpaste and similar products is now a real possibility, as will be described later. However, the equipment and controls for continuously feeding solids, especially in proportioned streams, is quite complicated and is without compensating advantages in this case. Batch operation is recommended for such preliminary mixing steps since simple and inexpensive batch equipment will perform these jobs of mixing solids in liquids, etc. so quickly and easily.

A semi-continuous process has been found to be the most convenient way in which to practice my invention; the two separate semi-final slurries are produced in large batches in large but light mixing tanks using simple agitators, after which the final mixing step and the remaining processing are carried out continuously. By flowing these two separate fluid slurries together continuously, and immediately passing their combined stream through a high-speed mixer such as a centrifugal pump, any and all of the various ingredients may be thoroughly and uniformly dispersed throughout the product regardless of how rapidly the binder reacts with the water and thickens the mixture. This continuous stream of the intimately mixed components is then forced at a controlled rate through the following equipment in series: a heating and/or holding zone to effect full hydration and reaction of the binder, and a cooling and/or holding and working zone to stabilize the gelling action of the binder and to produce the proper texture and consistency in the products. In most cases it is desirable to produce a product which is substantially free of air. This can be easily accomplished in my process by passing the steadily flowing stream of mixed components through a continuous film deaerator preferably placed just before the cooling and/or holding and working zone. Any minor ingredients which can be added to the mixture most readily in a heated or molten condition can be metered into the product before it enters this deaerator since the mixing action of a film deaerator will blend in such additions very successfully. Also, any minor ingredients which are very volatile or heat sensitive can be metered into the product stream after the deaerator if sufficient agitation is provided in the cooling and/or holding and working zone, or after both deaerator and cooling zone if a colloid mill or homogenizing zone or other mixing device is appended to the system.

I have found that the products of such a process possess exceptional stability relative to the amount of binder used and are free of discrete particles and lumps of gel or hydrated binder of the type commonly found in the same products made by conventional techniques. Even when treated especially to remove such small lumps as e. g. by milling, the distribution of gel is not as complete in those conventionally processed creams and pastes as in the products of the present process without a milling or homogenizing step. In addition, continuous processing of the fluid slurry is very convenient and carries many inherent advantages such as prevention of aeration, increased efficiency, more compact equipment, cleaner and more sanitary operation, greatly reduced processing time, and generally streamlined operations. In fact, all of the very desirable objects and features previously listed are obtained to an unsual and unexpected degree by the practice of this semi-continuous process.

With all binders of the class covered by this invention, the preliminary mixing steps involved in making the thin homogenous slurry should be carried out in the cold, preferably at about room temperature or slightly lower and not above 100° F. The more reactive the particular binder used, the more important it is that these slurry-making steps should be carried out at a low temperature and also the lower the temperature to which it is necessary to heat the slurry in order to form a paste or cream. This latter temperature varies from room tempeature to 180° F. for the several binders covered here.

In the description which follows, reference will be made to the attached drawings which are illustrative of the practice of certain embodiments of my invention. In these drawings.

Figure 1:
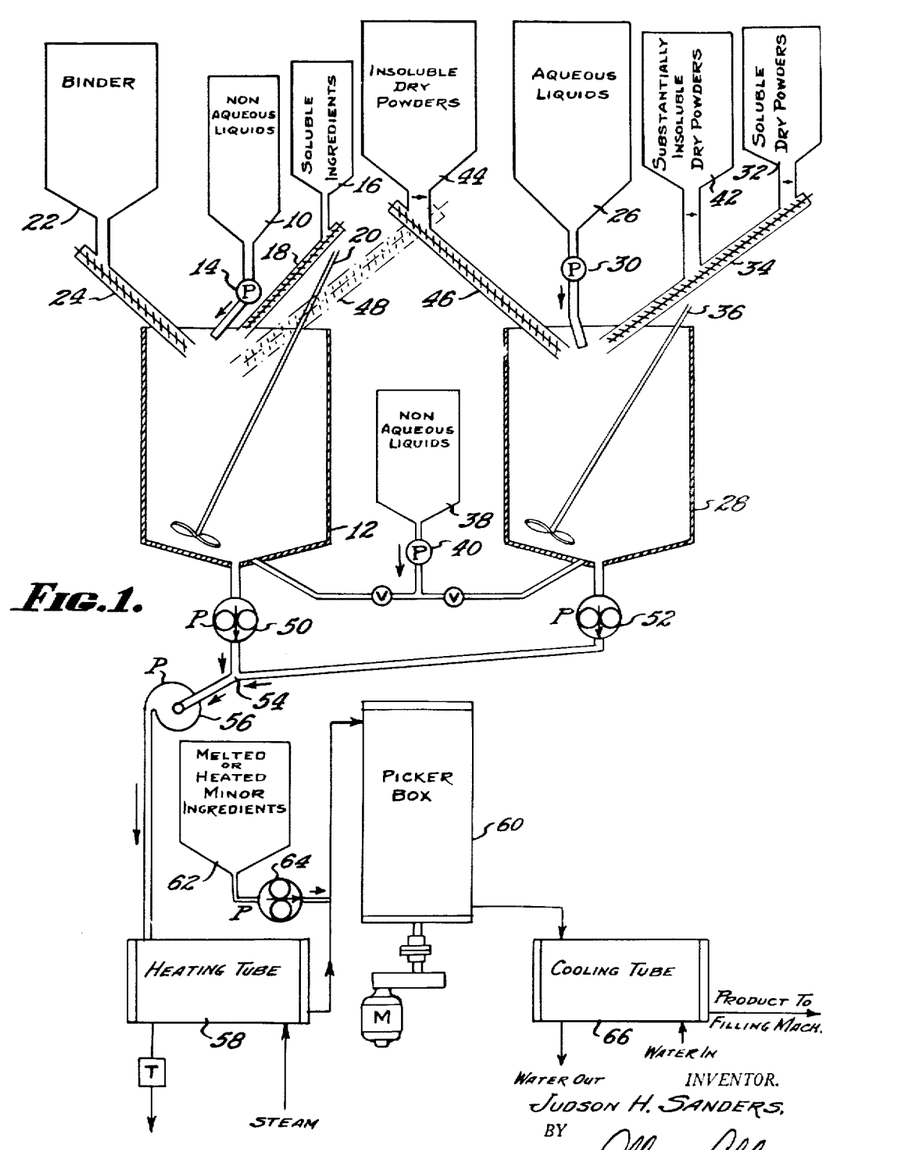
Figure 1 is a schematic flow chart showing the principal elements of the general process in semi-continuous operation. This form of the process can be practiced with any binder of the class covered herein.

Referring now to Figure 1, one method of carrying out my process is the following. Pump non-aqueous liquid from storage tank or tanks 10 into mixing tank 12 by means of pump 14. Transfer to this same tank 12 any ingredients which are soluble in such liquid, as from storage tank 16 by means of conveyor 18 and stir with agitator 20 to dissolve. Transfer binder from storage tank 22 into mixing tank 12 by means of conveyor 24, mixing it into the non-aqueous liquid as it is added by means of agitator 20. Pump the aqueous liquid from the storage tank 26 into the mixing tank 28 by means of pump 30. Feed the soluble dry powders from tank or tanks 32 into mixing tank 28 by means of conveyor 34. Mix with agitator 36 to effect solution. Add other non-aqueous liquid ingredients from storage tank or tanks 38 to mix tank 12 or to mix tank 28 or both by means of pump 40 and mix in with agitator 20 or agitator 36 or both. Feed insoluble dry powders from tanks 42 and 44 into mixing tank 28 by means of conveyors 34 and 46. Mix with agitator 36 as powders are being added to form a smooth slurry. If the amount of insoluble dry powders is large relative to the amount of liquids in tank 28 or if some of the dry powders are more compatible with and wet out better by the non-aqueous liquids in tank 12, a part of the dry powders or these special dry powders may be slurried in the non-aqueous liquids along with the binder. For example, these could be transferred from tank 44 to mixing tank 12 by means of conveyor 48 and mixed in by stirrer 20 to form a smooth fluid slurry with the non-aqueous liquids and the binder.

As indicated in Figure 1, these two separate fluid slurries are prepared in good-sized batches after which they are then mixed together during concurrent flow and processed continuously from this point on, yielding a steady stream of product as described below. By use of a second set of mix tanks (not shown) in which a second set of slurries could be prepared while the two original slurries were being pumped together and fed to the remaining equipment, production could be continued virtually without interruption. Of course, the entire process can be made absolutely continuous by continuously producing the two separate slurries in moving streams. This can be done by continuously mixing together in one passage the dry powders intended for slurrying with the non-aqueous liquid (this would include the binder), and in another passage the dry powders intended for slurrying with the aqueous liquid. Each stream of mixed and proportioned dry powedrs can then be fed into its intended concurrently flowing liquid medium in correct proportion to the rate of flow of said liquid through the pipe and provision made for thorough in-pipe mixing and turbulence down stream but before the two flowing finished slurries meet and become mixed together substantially as shown in Figure 1 and as outlined below.

Returning to the process as shown in Figure 1, the continuous mixing together and processing of the two fluid slurries, which comprise between the two substantially all the ingredients of the product, is carried out as follows. The slurries are pumped together by the independent pumps 50 and 52 which are arranged so that their total output can be varied without changing the proportions of the two slurries delivered once this proportion has been set. Mixing of the two slurries is accomplished by jet action of the two meeting streams at point 54 and by the rotary mixer 56. This homogeneous mixture of substantially all the ingredients is pumped under pressure through the heat exchanger 58 which is preferably one of the general class disclosed and claimed broadly in the U. S. Patent Re. 21,406 of C. W. Vogt, first issued as U. S. Patent 1,783,864. This type of heat exchanger is often referred to as a "freezer" or "scraped-tube heater or freezer," the latter of which forms of expression will be used hereinafter. Such scraped tube freezers or heaters consist of an annular shell through which the cooling or heating fluid is circulated and inside of which is another annular space through which the material being treated is forced and inside of which there is a rotatable shaft or member bearing various arrangements of knives or blades or combinations of scraping and/or mixing arms. Such scraped tube heaters or freezers are characterized by excellent heat transfer conditions due to the high ratio of surface to volume and the high coefficients which are maintained by keeping the surface scraped clean. They also provide for simultaneous mixing or agitation which is especially effective in the confined spaces of such equipment. The scraped tube heater 58 of Figure 1 is supplied with steam, but hot water or other heating media could be used. The homogeneous mixture of the combined slurries is pumped through this heater at such rate as to raise the temperature of the mix uniformly to the required level for complete activation and hydration of the binder so as to give maximum dispersion, gelling strength, stability and smoothness. These qualities are further enhanced by passing the heated mixture through a holding or soaking zone 60 where agitation or working of the hot stock is continued in a mild form. A convenient and adequate size for this zone is usually that sufficient to provide an average resident time for the stock of about 3-5 minutes. Such a zone for holding and working plastic or semi-plastic materials will hereinafter be called by its common designation of a "picker box." Any minor ingredients which should be added hot or molten can be metered into the stock just before it enters the picker box 60. For example, such ingredients can be pumped from tank 62 by means of metering pump 64. The stock from the picker box next enters the scraped tube cooler 66 in which the temperature is uniformly reduced to a level sufficiently low to stabilize the gelling action of the binder and produce a smooth, fine consistency and a soft and creamy texture in the product. The scraped tube cooler 66 is supplied with cold water, but brine or other refrigerants could be used. After leaving the scraped tube cooler the finished paste or cream may be delivered to storage or to filling equipment.

Aeration of product has been eliminated as a serious problem by the present invention, presumably because of the ease with which air is wet off and desorbed from the dry powders by the ungelled and unthickened liquids and also because of the extent to which incorporation of air can be prevented while mixing a non-viscous mixture with the simple mixing equipment and for the short time required in the present processes. The prevention of air incorporation is further aided by the use of the continuous closed system of scraped tube heat exchangers for heating and cooling. Insurance for a completely air free product can readily be provided by interposing a continuous film deaerator in the process, preferably after the heater or the picker box as air is most easily removed under the conditions of high temperature and fluidity which exist at these points.

Figure 3:
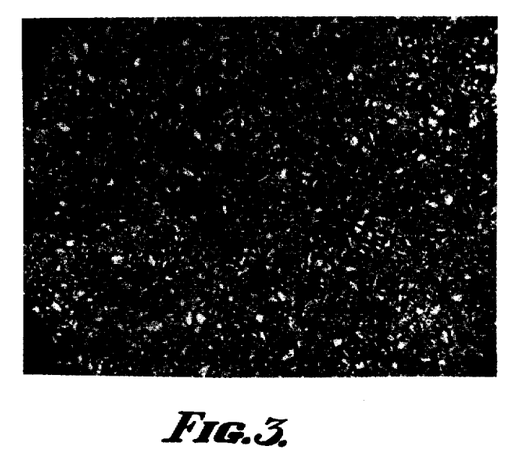
Figures 3 and 4 are micrographs of smears of a paste made by two different processes. These will be referred to later to illustrate some of the beneficial results of the present process.
Figure 4:
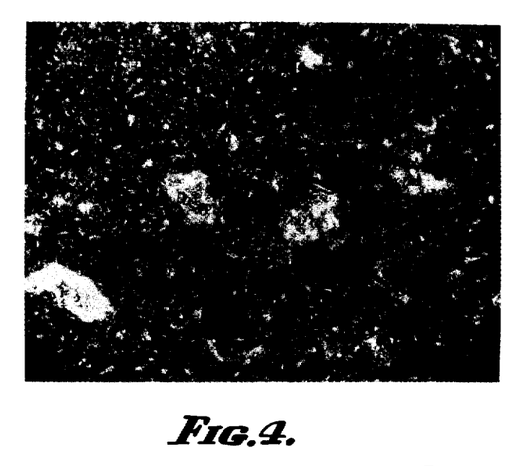

One of the most striking advantages of the present process for making pastes and creams is the fine degree of dispersion of the solid ingredients which is effected, particularly of the gel formed by hydration of the binder. The distribution of this material which is obtained by the simple practice of this invention is better than that which results from the aforementioned customary processes involving a separate gel making step even when colloid mills or other homogenizing devices are employed to help break up, disperse, comminute and blend in the lumps which usually form in such processes. Figure 3 is a micrograph at 100 magnification of a smear of toothpaste prepared by the process of the present invention. Figure 4 is a similar micrograph also at 100 magnification of a smear of toothpaste made by the identical formula but by a conventional process in which the binder is first hydrated to form a mucilage or gel into which the remaining ingredients including the other powdered solids are then mixed. The large light colored patches in Figure 4 are discrete particles of undispersed gel which are seen to be absent in Figure 3.

Apparently the dispersion of powdered solids is accomplished more easily and completely in the non-viscous liquid media recommended in the present process than in the thick gels and mucilages which have been recommended heretofore. Also, by dispersing the binder not just in some of the liquids but in substantially all of the liduids and along with other solids as well, a more thorough and homogeneous distributionv of this material is seen to be effected. This is believed to be due to the fact that the dry binder is dispersed and distributed in finely divided form throughout substantially the entire mix before the penetration of the binder by water and the resultant hydration and gelation occur, and to the fact that each swelling binder particle is actually being macerated and mixed with the other ingredients during the time that hydration and gelation are occurring and during the time at which the resulting gel particle is most thoroughly fluidized due to the increased temperatures which are usually employed in activation of the binder.

Since, at the time the binder particle does hydrate and become active, it is already in intimate contact with the remaining ingredients of the product (both liquids and solids), it is in a better position to adhere to or react and combine with these ingredients, and consequently the maximum efficiency and utility is obtained from the binder. Thus, not only is the appearance and quality of the resulting paste or cream improved by the absence of discrete lumps or particles of powder or gel, but also better and more efficient use is made of the binder ingredient. So, as a result of this, for a given consistency and stability of finished product, less binder is required; or for a given amount of binder in a given formula, better consistency and stability result through the practice of the present invention. Obviously, while colloid mills and such lump removal equipment are not necessary in the present invention, the process definitely admits of their use. For example, a colloid mill could be placed at the end of the process with the finished product passing through such a device before going to the filling machines or to storage.

Figure 2:
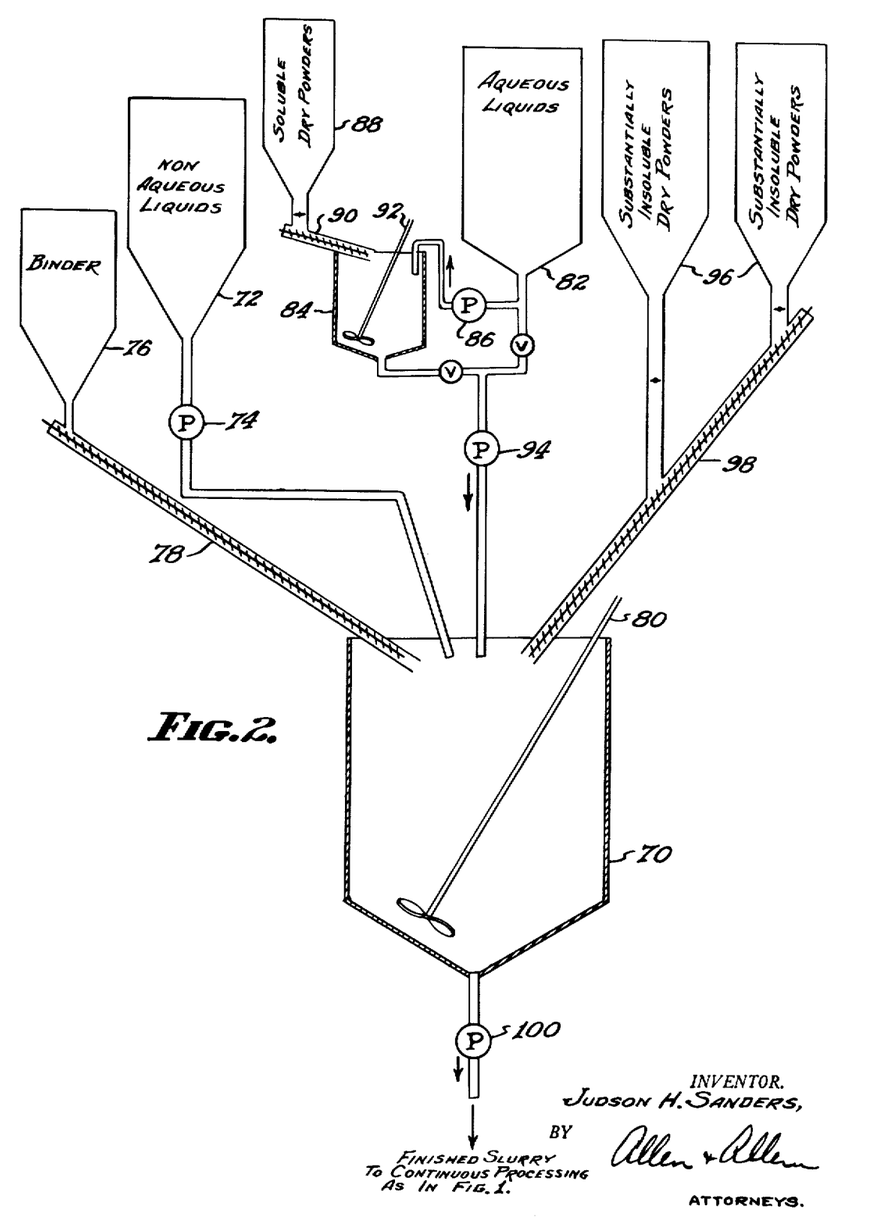
Figure 2 is a schematic flow chart showing one of the many possible variations in sequence of slurry-mixing steps. This form of the slurry-making process can be used only with those binders which, if first wet out with a non-aqueous liquid before contacting the water, will then hydrate rather slowly on contacting water in the cold.

An alternate sequence of mixing steps to that of Figure 1 is shown in Figure 2. Mixing sequences of the type shown in Figure 1 where the binder does not contact the aqueous ingredients until after the powders have been dispersed in the liquid media are suitable for use with any and all binders, whereas the mixing sequence of Figure 2 is particularly suited for use with binders which are sufficiently reduced in low-temperature activity that they will hydrate or go into colloidal solution only rather slowly on contacting cold water or cold aqueous solution under the conditions to be outlined below. Such binders, if first wet out in non-aqueous liquid, can be slurried with the aqueous solution to give a mixture that will remain fluid for several minutes at least and in some cases for many hours so that the remaining powders can be dispersed therein with ease using only simple stirrers for mixing. One class of such binders comprises the mucilaginous extracts which are derived from sea algae of the genus *Chrondrus crispus* (popularly called carragheen or Irish moss), a member of the class of red algae or Rhodophyceae. Carragheenin, the extract of *Chondrus crispus*, is not a pure compound by any means but consists principally of long chains of galactose residues joined by 1,3 linkages. Acid sulfate ($HSO_4^-$), halides ($Cl^-$, $Br^-$, $I^-$) or other anions commonly found in sea water are substituted on these complex polysaccharide molecules at scattered or perhaps regularly spaced points. The common sea water cations, especially calcium, are often substituted for the hydrogen of the acid sulfate radical. For this reason, carragheenin has been referred to as calcium sulfate carragheenate and represented by a formula such as However, the natural Irish moss extract or carragheenin as usually obtained is really a mixture of the sulfuric acid half ester and its calcium, magnesium, potassium, sodium and other salts, the calcium salts predominating. This natural extract or any carragheen extract in which calcium cations predominate is ideally suited for use with the mixing procedure of Figure 2. This is because of the slow reaction which such binders exhibit with cold water after first having been wet out with non-aqueous liquids.

It has been found possible by ion exchange methods to replace this varied mixture of naturally occurring cations ($H^+$, $Ca^{++}$, $Mg^{++}$, $K^+$ and $Na^+$) by straight $Na^+$ ions. Such modified extracts which are often called sodium carragheenates are now commercially available and are characterized by high activity and rapid reaction with water in the cold even when first wet out with non-aqueous liquid and the ability to achieve full gelling strength at lower temperatures than the natural extracts. These modified extracts are not suitable for use in a mixing sequence as in Figure 2 in which the binder and the cold aqueous solution are mixed together prior to complete dispersion of the insoluble powders.

Other binders which are suitable for operation in a mixing sequence like that in Figure 2 include starch, and modified alginate compounds substantially as described in U. S. Patent 2,238,906 to Martell and Schaller. It has been found desirable to adjust the pH to at least 10.0, however, as well as to use the borax additive described in said patent in order to render such alginate binders suitable for the type of mixing sequence shown in Figure 2.

Referring to Figure 2, the preferred mixing method for use with these slowly-hydrating binders is as follows: Pump the desired amount of non-aqueous liquids from the storage tank or tanks 72 into the batch mixer 70 by means of pump 74. Transfer the correct amount of binder from the storage tank 76 into the batch mixer 70 by means of conveyor 78, mixing it into the non-aqueous liquid as it is added by means of agitator 80. Pump some of the aqueous liquid from storage tank 82 into mixing tank 84 by means of pump 86. Add soluble solid ingredients to mix tank 84 from storage tank 88 by means of conveyor 90. The contents of tank 84 should then be mixed with agitator 92 to effect solution. The aqueous solution is next pumped from tank 84 to mix tank 70 by means of pump 94 and mixed in with the binder and non-aqueous liquids. Next, pump remaining aqueous liquid from storage tank 82 to mix tank 70 by means of pump 94 and blend in with agitator 80. Now transfer the insoluble dry powders from storage tank or tanks 96 into the mix tank 70 by means of conveyor 98 and mix in with agitator 80 as they are added to form smooth slurry containing substantially all the ingredients. This homogeneous slurry can then be withdrawn via pump 100 and processed continually as shown in Figure 1 through the system beyond the mixer 56.

It should be noted that in the continuous processing of Figure 1, it has been suggested that the heating and cooling operations be accompanied by continuous scraping of the heat transfer surfaces and continuous mixing of the main body of material such as are provided by scraped tube heaters and coolers. Such conditions are favorable to the production of a smooth product with maximum fineness of gel dispersion and freedom from lumps. In fact, scraping and mixing during cooling is necessary with products employing most of the phycocolloidal binders, if a smooth product of uniform consistency and texture is to be obtained without special milling and homogenizing.

Handling of solids is accomplished by means of conveyors in the processes as illustrated in Figures 1 and 2. Other conventional devices for feeding and handling solids could be substituted instead. Where solids are charged to batch mixers or slurry tanks, this may be accomplished manually or by manually operated power equipment, etc.

The following examples illustrate my invention but it will be understood that they are illustrative only and not to be construed as limiting the scope of my invention.

*Example 1.*—The following procedure was used in making a toothpaste containing as the binder a chemically unmodified extract of Irish moss or carragheenin.

(1) 1.35 parts of natural extract of the moss, *Chondrus crispus,* gathered from the Atlantic ocean near the east of North America was slurried in 27 parts of glycerine at a temperature of about 80° F.

(2) 20.7 parts of water at room temperature and containing about 0.1 part saccharin was added and mixed into the slurry from (1).

(3) 38.8 parts of dicalcium phosphate, 0.9 part of flavoring oils and 1.1 parts of synthetic organic detergent were then dispersed into the slurry from step (2). This entire mixture was thoroughly blended together producing a single homogeneous slurry at a temperature of about 78° F.

(4) This homogeneous fluid slurry from (3) was then processed continuously by pumping same at a flow rate of 108 lbs./hr. through the following equipment in series. A scraped tube heater, heated by low-pressure steam, in which the temperature of the stock was raised to 176° F.; a holding and agitating zone of sufficient size to hold about 9 lbs. of said stock and during passage through which the stock temperature fell to about 143° F.; a scraped tube cooler, cooled by 45° F. water, in which the temperature of the stock fell to 64° F. The finished toothpaste emerging from this scraped tube cooler possessed a very smooth creamy texture was free of any visible inhomogeneities, and contained only about 3% air by volume.

A similar slurry to that produced in step (3) above was processed as in step (4) above except that it was pumped at a rate of 112 lbs./hr., heated to only 166° F. in the scraped tube heater and passed through a holding and agitating zone which provided a capacity of only about 4.5 lbs. The finished toothpaste produced by this modified process was also free of any visible inhomogeneities, had a glossy uniform appearance, and contained only 3% air by volume.

In another modification of this process, a film deaerator was interposed between the holding and agitating zone and the scraped tube cooler. Using a vacuum of 20–28" Hg in this deaerator, the air content of the final toothpaste product was reduced substantially to zero without changing the desirable properties of the paste in other respects.

*Example 2.*—Given the following formula for a toothpaste:

| | Per cent by weight |
|---|---|
| Precipitated chalk (medium weight) | 38 |
| Sodium carragheenate (modified Irish moss extract) | 1 |
| Synthetic foaming agent | 2 |
| Glycerine | 30 |
| Water | 28 |
| Soluble saccharin | 0.1 |
| Flavor | 0.9 |

The production of such a toothpaste by my process is carried out by the following procedure:

(1) Dissolve the saccharin in the water and blend ⅔ of the glycerine into this solution. Disperse the chalk, flavor and foaming agent into this fluid medium all at room temperature.

(2) Wet out the sodium carragheenate binder in the remaining glycerine also at room temperature.

(3) Continuously pump and mix together proportioned streams of the slurries from steps (1) and (2).

(4) Pass the homogeneous mixture of combined slurries from step (3) through a scraped tube heater in which the temperature is raised to 140° F. and then through a picker box providing an average residence time of about 5 minutes for the stock.

(5) Next pass the stock through a scraped tube cooler to reduce the temperature of same to at least 95° F.

It is not absolutely necessary to heat the slurry from step (3) in order to make a satisfactory paste from a binder such as sodium carragheenate. This material will hydrate completely and attain full gelling strength without heating if the homogeneous mixture from step (3)

above is allowed to soak for 30–60 minutes at room temperature. After this, it would be passed through the picker box or the scraped tube cooler or both but without the use of coolant in the latter since the stock is already at room temperature. However, the process is shorter and a smoother product generally results when heating and cooling is used even with binders such as this which do not require heating to attain full gelling strength.

*Example 3.*—Given the following formula for a toothpaste:

| | Per cent by weight |
|---|---|
| Tricalcium phosphate | 35.0 |
| Powdered gum tragacanth | 1.0 |
| Synthetic detergent | 2.0 |
| Water | 26.0 |
| Glycerine | 30.0 |
| Powdered soluble saccharin | 0.1 |
| Preservative | 0.1 |
| Flavor | 0.8 |
| Alcohol | 5.0 |

According to my process the following procedure is used to produce a paste of the above composition.

(1) Dissolve the preservative and the flavor in the alcohol and then disperse the gum tragacanth in this alcohol solution at room temperature.

(2) Dissolve the saccharin in the water, add the glycerin and disperse the tricalcium phosphate and the detergent in this mixture all at about room temperatures.

(3) Continuously pump together the slurry from step (1) and the slurry from step (2) and provide instant turbulence and mixing of the combined streams by means of a high speed rotary mixer.

(4) Pass the mixture resulting from step (3) through a scraped tube heater equipped with beaters and scrapers and sufficient heat transfer surface to heat the mixture to a uniform temperature of 160° F.

(5) Next pass the mix through a scraped tube cooler equipped with beaters and scrapers and sufficient heat transfer surface to reduce the temperature to 100° F.

If absolute freedom from air were desired, the stock could also be passed through a film deaerator placed between the heater and cooler.

In contrast to the above outline of a method of practicing the present process, the following is given as a typical procedure for making a similar toothpaste by conventional methods.

(1) Same as step (1) above.

(2) Either heat the water to 190–200° F. and add it to the slurry from step (1) with mixing, or add the water at room temperature to the slurry from step (1) and heat the entire mixture to about 160 to 170° F. Allow a soaking or/and heating time of ½ hour or more depending upon the degree of mixing.

(3) Transfer the resulting gel or mucilage from step (2), strained if necessary, to a heavy-duty batch mixer and slowly and gradually sift in the powdered solids while mixing proceeds.

(4) Continue to work and mix the dough to work out lumps and squeeze out air. This generally requires about 2–4 hours. Even if working in a vacuum mixer, the vacuum can only be applied very gradually because of a tendency to expand the stock and draw product up into the vacuum lines.

(5) Slowly and gradually add the glycerine as mixing continues. Continue to work in glycerine until mix is again homogeneous.

(6) If mix is appreciably about 100° F., cool to 100° F. or less.

The glycerine is included in the original mucilage and/or the flavor is withheld and mixed in at the end of the process in some cases of practicing the conventional type of gel making process.

*Example 4.*—Given the following formula for a toothpaste:

| | Per cent by weight |
|---|---|
| Calcium sulfate | 40.0 |
| CMC (carboxy methyl cellulose) | 1.9 |
| Detergent | 1.0 |
| Glycerine | 26.5 |
| Water | 30.0 |
| Saccharin | 0.1 |
| Flavor | 0.5 |

In order to produce a toothpaste of the above composition by my process, the following procedure is used:

(1) Wet out the CMC in about ¼ of the glycerine at room temperature or thereabouts.

(2) Dissolve the saccharine and detergent in the water, add the remaining glycerine and disperse the calcium sulfate in this liquid mixture all at about room temperature.

(3) Mix the slurry from (1) and the slurry from (2) with each other as rapidly and thoroughly as possible by pumping the two together at rates proportionate to their total amounts and providing additional turbulence for the combined streams, as e. g. by use of a high speed centrifugal pump.

(4) Pass the homogeneous mixture from (3) continuously through a scraped tube heater in which the temperature is increased to 160–270° F., then through a scraped tube cooler in which the temperature is reduced to 100° F.

(5) Meter in the flavor continuously to the stock flowing from the cooler and pass the flavored product through a colloid mill without interruption of flow in order to mix in the flavor and homogenize the mixture.

*Example 5.*—Given the following formula for a toothpaste:

| | Percent by weight |
|---|---|
| Calcium carbonate (medium weight) | 35.0 |
| Sodium alginate binder | 1.0 |
| Soap | 4.0 |
| Propylene glycol | 12.4 |
| Glycerine | 20.0 |
| Water | 27.0 |
| Soluble saccharin | 0.1 |
| Flavor | 0.5 |

In order to produce a toothpaste of this composition by process, the following procedure is used:

(1) Wet out the sodium alginate in the propylene glycol at room temperature.

(2) Dissolve the saccharin in the water and disperse the soap in this solution. Then add the glycerine and mix in and disperse the calcium carbonate in the mixture all at about room temperature.

(3) Rapidly mix together the slurry from step (1) with the slurry from step (2) by pumping proportioned streams of the two together into a turbulent zone provided by a rotary mixer.

(4) Heat the combined flowing streams to 140° F. by passing through a scraped tube heater.

(5) Cool back to room temperature in a scraped tube cooler provided with beaters and scrapers to mix the stock and scrape the heat transfer surfaces continuously.

(6) Pass through a film deaerator to remove final traces of air.

(7) Meter in flavor just before passing stock through a colloid mill or other enclosed mixer.

While all the binders covered by the present invention function in substantially the same manner, i. e. by colloidally dissolving in or undergoing hydration or solvation by the water or other polar solvents, there is nevertheless a wide variation in the degree of activity exhibited by the various sub-classes of binders as well as by the various members of even the same sub-class. Because of this variation in activity, considerable latitude must be used in stating the requirements or process conditions, such as exact sequence of mixing steps and temperatures required to produce the liquid slurries, temperatures and soaking times required for complete activation of the binder and the degree of mixing and scraping required during heat transfer operations particularly during cooling.

For example, it has already been outlined in connection with Figure 2 how such binders as the natural, chemically unmodified extract of Irish moss or carragheen (*Chondrus crispus*), if first wet out in non-aqueous liquid, can be allowed to contact the cold water during the mixing process before the dry solids are fully dispersed in the liquids. This is possible because such an extract, if wet out with a suitable non-aqueous liquid before being mixed with the aqueous liquid, will not hydrate appreciably in the cold for several hours at least (at 100° F. or less). Other binders which may be used in this same mixing sequence include starches, and alginates which have been modified as outlined in U. S. Patent 2,238,906 by J. K. Martell and J. W. Schaller.

In general, the more reactive a binder is in the cold, the lower the temperature to which it is necessary that it be heated to accomplish full and complete hydration or solvation. For example, sodium carraugheenates (modified extracts of *Chondus crispus*) and the algin extracts which are derived from another class of sea algae, namely the kelps of the Phaeophyceae or brown algae class including such genera as Macrocystis. Nereocystis, Pelagophycus, Fucus and Laminaria, need be heated to no more than 140° F. and can attain full gelling strength on prolonged soaking even if not heated at all. Most of the natural gums such as gum tragacanth, gum acacia and gum karaya and the manufactured gums such as carboxy methyl cellulose need only be heated to about 160° F. In fact, one of the manufactured gums shows just the reverse action as regards variation in hydration or solution activity with temperature. This material, methylcellulose, can be mixed with hot water at temperatures of 140° F. or over without its hydrating and gelling and the resulting mixture must be chilled (to about 40–50° F.) to effect complete colloidal solution. Application of this material in the process of the present invention is therefore best carried out under different or substantially reversed temperature cycles. Thus, the liquid ingredients would be heated slightly initially until powders were wet out and dispersed therein and combined into the single homogeneous slurry, followed by cooling to cause hydration and thickening.

The natural, chemically unmodified carragheen extracts obtained from *Chondrus crispus* and the agar extracts which are derived largely from the Gelideaceae family of the algae of the Rhodophyceae class of sea algae including such species as *Gelidium amansii, Eucheuma muricatium, Gelidium nudifrons, G. pyrimidale, G. cartilagineum, G. australe* and *G. lichenoides,* generally require a temperature of 160–170° F. for thorough hydration.

Starch in its usual forms requires a temperature of about 180° F. for full hydration.

The above temperatures are good approximations of the required conditions assuming the processing is carried out continuously in scraped tube heaters and coolers and includes a soaking zone which provides for about 5 minutes' soaking time at the above temperature. Somewhat higher temperatures are advisable if no soaking time is used and somewhat lower temperatures may be used if the soaking time is considerably extended.

In general, the binders which are derived from seaweed, i. e. the phycocolloidal binders are most sensitive as regards the effect of cooling on gelling action. For this reason, pastes made with phycocolloidal binders generally require continuous mixing and scraping of the heat transfer surfaces during the cooling operation until a certain critical temperature (at least as low as 100° F.) is reached, in order to produce soft texture and creaminess in the final product. Generally with such binders, a temperature of 95–90° F. should be reached before mixing is halted.

The natural vegetable gums, starch, and the manufactured gums are not so sensitive in this respect. Cooling to a temperature of 100° F. before agitation is stopped is always sufficient with these materials, and a temperature of 110° F. is probably adequate for most purposes.

The new technique of mixing cosmetic pastes and creams disclosed herein is generally practical for large scale operation with rapidly-hydrating binders only in a process involving at least one continuous mixing step, namely that step in which binder slurry and water slurry are mixed together. However, with the slowly-hydrating binders, batch operation can be employed satisfactorily for mixing the complete homogeneous slurry in the manner shown in Fig. 2. With binders of this type the processing of the homogeneous slurry can also be carried out as a batch operation by heating and cooling in a heavy duty jacketed mixer of the type conventionally employed with old mixing techniques. Such batch operation in the present process does not effect as much simplification in equipment, nor as great a reduction in space requirements, nor is it as convenient as the semi-continuous operation. Neither does it cut down the processing time as much, nor eliminate processing problems to the same extent. However, the inherent advantages of the simplified mixing operation are realized and the improvements in quality of product are just about as great. The big exception is that the greater ease of producing an air-free product is sacrificed. While less air may be incorporated in a batch of product mixed by my technique, it is almost as difficult to deaerate completely a large batch of such product as a large batch of similar product containing a considerably larger amount of air. Removing even a small amount of air such as 2 or 3% by volume from a large batch of viscous material is at best a slow tedious process.

It will be apparent to one skilled in the art that my invention is susceptible of many minor variations as regards actual sequence of mixing steps for the many different possible types of materials used as ingredients in the process. All such non-critical variations are intended to be included in the scope of the following claims.

Having thus described my invention, what I claim and desire to secure by Letters Patent is:

1. A process for producing a homogeneous paste-like product, the essential ingredients of which include a hydrophilic colloidal carbohydrate binder, insoluble non-colloid solid matter, aqueous liquid, and substantially non-aqueous but substantially water miscible liquid, without the use of heavy-duty mixing equipment, which process comprises blending said binder in dry, comminuted unhydrated form with said substantially non-aqueous but water-miscible liquid to form a mobile slurry, then blending said slurry and the remainder of said ingredients to form a homogeneous mixed mass, all prior to substantial hydration and gelation of the binder, then maintaining the said homogeneous mixed mass under mild agitation to prevent separation of ingredients until gelation and consequent stabilization has occurred, and thereafter discontinuing said agitation.

2. The process claimed in claim 1, wherein during the said period of mild agitation the homogeneous mixed mass is subjected to temperature change to promote gelation and stabilization.

3. The process claimed in claim 1, wherein during the said period of mild agitation the homogeneous mixed mass is heated to a temperature of about 160° to 180° F. to promote the hydration of said binder and is thereafter cooled to a temperature at least as low as about 95° F. to promote stabilization of the said homogeneous mixed mass.

4. The process claimed in claim 1, wherein the said aqueous liquid and insoluble non-colloid solid matter are blended together to form a second mobile slurry, and in which the said mobile slurries are blended together, all prior to substantial hydration and gelation of the binder.

5. The process claimed in claim 3, wherein the said blending steps are carried on at a temperature of no more than about 100° F. to delay gelation of the binder.

6. The process claimed in claim 3, in which said homogeneous mixed mass is in a state of continuous travel from the last mentioned blending step to the point of discontinuance of the said mild agitation.

7. The process claimed in claim 4, wherein during the period of the said mild agitation the homogeneous mixed mass is heated to a temperature of substantially 140° to 180° F., held at the said temperature for at least about 3 to 5 minutes, and then is cooled to a temperature at least as low as about 90° to 100° F., all during a continuation of the said mild agitation and all during continuous travel of the homogeneous mixed mass.

References Cited in the file of this patent

The Cosmetic Formulary, volume 1, New York, 1937, page 214.

Drug and Cosmetic Industry, December 1944, "Dentifrices," pages 672, 748 to 753.

Amer. Perf. and Essential Oil Review, July 1951 (58:1), pages 33 to 35.

Spalton: Pharmaceutical Emulsions and Emulsifying Agents, Chemist and Druggist, London, 1950, pages 36 and 37.

UNITED STATES PATENT OFFICE
Certificate of Correction

Patent No. 2,751,328                                                   June 19, 1956

Judson H. Sanders

It is hereby certified that error appears in the printed specification of the above numbered patent requiring correction and that the said Letters Patent should read as corrected below.

Column 1, line 34, for "monosacchardie" read —monosaccharide—; line 42, for "*brachcalyx*" read —*brachycalyx*—; line 43, for "*adscendenes*" read —*adscendens*—; column 4, line 24, for "hapidly" read —rapidly—; column 6, line 37, for "powedrs" read —powders—; column 7, line 73, for "liduids" read —liquids—; line 74, for "distributionv" read —distribution—; column 8, line 50, for "*Chrondrus*" read —*Chondrus*—; column 12, line 27, for "160–270° F." read —160–170° F.—; column 13, line 23, for "carraugheenates" read —carragheenates—.

Signed and sealed this 28th day of August 1956.

[SEAL]

Attest:
KARL H. AXLINE,
*Attesting Officer.*

ROBERT C. WATSON,
*Commissioner of Patents.*